W. J. HISS, Jr.
CABLE HANGER.
APPLICATION FILED OCT. 9, 1905.
934,808.
Patented Sept. 21, 1909.
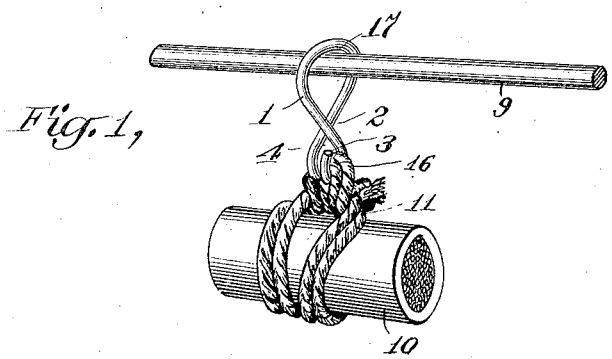
Fig. 1,
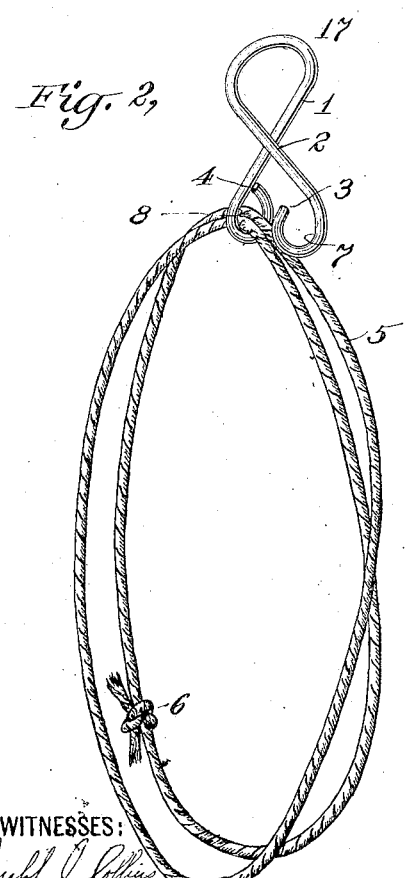
Fig. 2,
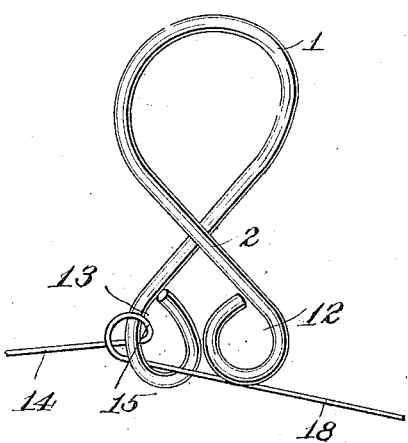
Fig. 3,
WITNESSES:
Joseph J. Collins
Josephine A. Greene.
INVENTOR
William J. Hiss, Jr.
BY
Duncan & Duncan
ATTORNEYS

UNITED STATES PATENT OFFICE.

WILLIAM J. HISS, JR., OF NEW YORK, N. Y., ASSIGNOR TO DIAMOND EXPANSION BOLT COMPANY, A CORPORATION OF NEW YORK.

CABLE-HANGER.

934,808.   Specification of Letters Patent.   Patented Sept. 21, 1909.

Application filed October 9, 1905. Serial No. 281,933.

*To all whom it may concern:*

Be it known that I, WILLIAM J. HISS, Jr., of the city, county, and State of New York, have invented a certain new and useful Improvement in Cable-Hangers, of which the following is a specification, taken in connection with the accompanying drawing.

This invention relates to cable hangers and relates especially to such hangers as are employed in supporting telephone or telegraph cables from guy wires.

In the accompanying drawings showing illustrative embodiments of this invention, Figure 1 is a perspective view of the hanger applied to a cable; Fig. 2 is a perspective view of the hanger detached; and Fig. 3 shows a modification.

In the form shown in Fig. 1, the hanger consists of a metal clip 1 preferably formed of wire bent upon itself to form a substantially closed loop 17 with the ends of the loop crossing at point 2 and bent back upon themselves as shown at 3 and 4 respectively. The end 4 is bent back to form a closed eye 8 within which is firmly secured a suspender cord consisting preferably of tarred marline, though leather woven wire cable or any other suitable material may be used. This cord is preferably doubled and the ends secured in any suitable manner as by a knot 6. The other end 3 of the clip may form an open hook 7.

To apply the hanger to a cable the double loops of the suspender cord are passed around the cable 10 and the clip with that portion of the cord 16 held within the closed eye 8 is passed through the loop 11 of a suspender cord as shown in Fig. 1. The guy wire 9 is then passed through the opening between the adjacent bent portions of the clip indicated at 2, the final step on applying the device being to slip the double strands 16 of the suspender cord into the open hook 7. By the employment of this hanger a firm connection is made between the cable and the guy wire and one which cannot be accidentally broken. This is particularly true, since as the weight of the cable bears down upon the suspender cord it exerts a lateral pressure on the two ends of the clip which causes the hook 7 and eye 8 to approach each other, thereby closing the opening between the bent portions of the clip and preventing the hanger from being accidentally detached from the guy wire. The hanger may also be conveniently supplied to the lineman in the form shown in Fig. 2.

In the modification shown in Fig. 3 the clip is formed with securing means in the form of two closed eyes 12 and 13 and a piece of wire or cord is passed through the eye 13 and a portion 15 of this wire wound around the eye so as to provide the free ends 14 and 18 which may be passed through the eye 12 and secured around the cable in an obvious manner.

Having described this invention in connection with the different illustrative embodiments mentioned, to the details of which I do not desire to be limited, what I claim as new and what I desire to secure by Letters Patent is set forth in the appended claims.

1. A cable hanger consisting of a wire clip bent upon itself to form a loop, the ends of said clip being extended past their crossing point and bent back upon themselves to form a coöperative eye and hook and a suspender cord passing through said eye and forming a loop.

2. A cable hanger consisting of a metal clip forming a loop, the ends of said clip forming a coöperative eye and hook and a suspender passing through said eye and forming a loop.

3. A cable hanger consisting of a clip forming a loop having coöperative securing means on the ends of the same and a suspender permanently engaging said securing means.

4. A cable hanger consisting of a metal clip having a closed loop on one end, securing means comprising an open hook on the coöperating end of said clip, and a suspender passing through said closed loop and adapted to engage said securing means.

5. A cable hanger consisting of a metal clip forming a loop, the ends of said clip forming a coöperating eye and hook and a suspender to coöperate with the eye and hook of the clip.

WILLIAM J. HISS, JR.

Witnesses:
JESSIE B. KAY,
JOSEPH J. COLLINS.